United States Patent Office 3,551,947
Patented Jan. 5, 1971

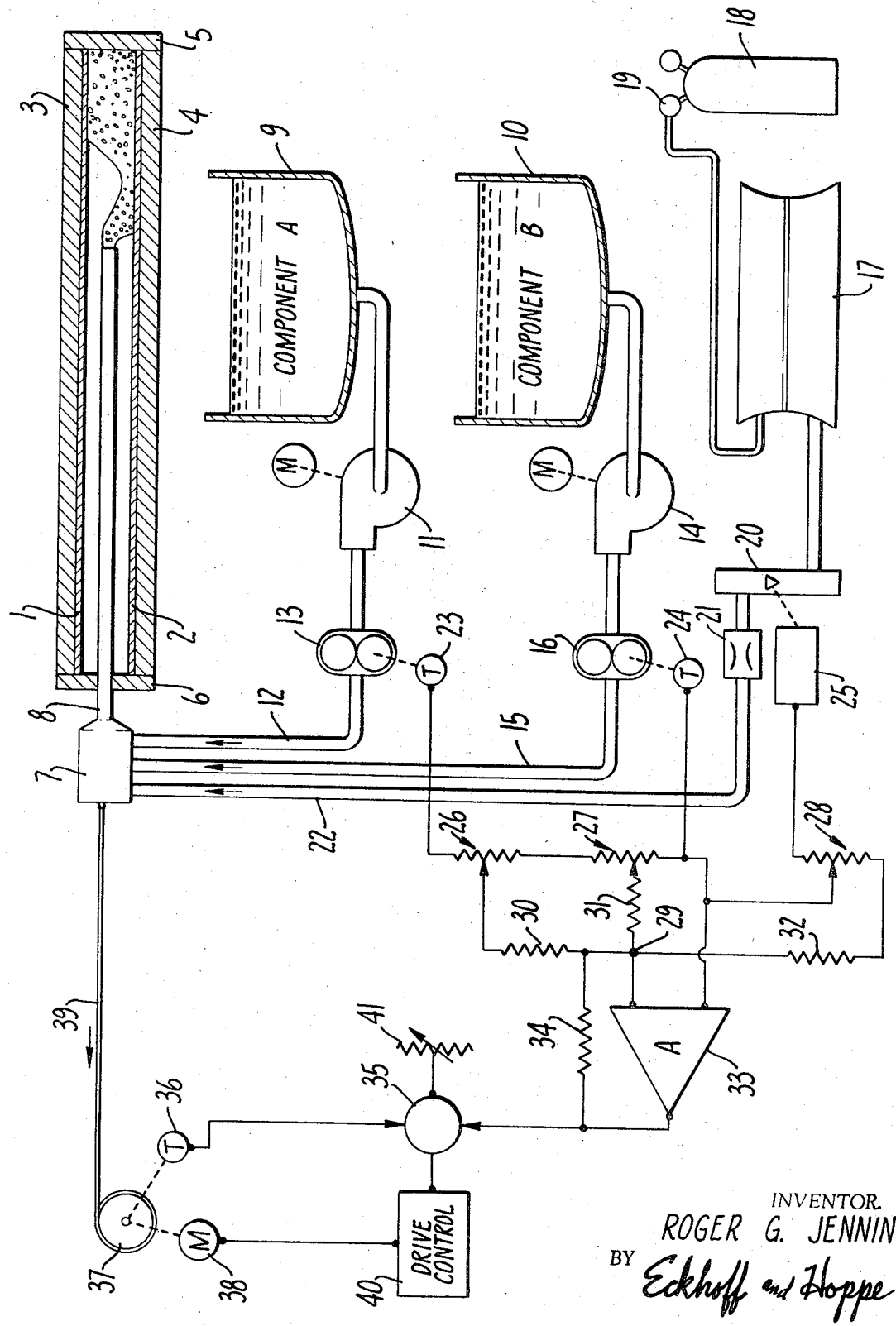

3,551,947
APPARATUS FOR FILLING MOLDS WITH POLYURETHANE
Roger G. Jennings, Oakland, Calif., assignor, by mesne assignments, to Control Building Systems, Inc., Oakland, Calif., a corporation of California
Filed Sept. 3, 1968, Ser. No. 756,859
Int. Cl. B29c 5/00
U.S. Cl. 18—5                                                     6 Claims

ABSTRACT OF THE DISCLOSURE

Apparatus for forming objects with foam-in-place plastics using a movable probe and further comprising means for moving the probe at a controlled rate, a mixing head connected to said probe for combining various components used to produce a polyurethane foam, means for feeding each of the essential components into said mixing head, means for measuring the speed at which each component, respectively, is fed to said mixing head and simultaneously producing a signal in proportion to the combined mass flow rate of the components, and means responsive to said signal for moving the probe at a controlled rate.

---

This invention relates to methods and apparatus for filling molds with polyurethane foam. It more particularly relates to methods and apparatus for forming products with foam-in-place plastics to produce superior strength characteristics and controlled density.

The manufacturing of composite panels or sandwich panels using foam-in-place core materials is now well known. Such foams as polyurethane are commonly produced with two or more components which, when mixed together in the proper proportion, react together and simultaneously expand to form a rigid low-density cellular plastic. The self-bonding characteristics of foam-in-place plastics, particularly polyurethane foams, allow them to be used to form composite panels having rigid surface sheets made of metal, wood or other plastics. The strength of the composite panels will depend upon the density of the core material, the strength and thickness of the facing materials, and the overall thickness of the panel itself. Usually these composite panels have high strength to weight ratios and excellent insulating properties which make them useful in the construction of commercial, residential and industrial structures.

Many production difficulties have been found in the manufacture of composite panels using foam-in-place plastics. These difficulties are largely associated with the fact that the liquid chemicals used in their manufacture must be injected into a void or space between two facing panels in an amount sufficient to fill the void and form a continuous core. The difficulty comes in dispensing the required amount of liquid components which may expand from 20 to 30 times their original volume. Even when the chemicals are introduced as a pre-expanded froth they may expand 2 to 5 times their original volume.

One of the problems experienced from this is that the foam-in-place plastic will rise in a vertical direction within the mold and, presuming that sufficient foaming components have been injected, strike the top surface of the panel and begin to move laterally. This lateral movement is important when used to fill the void between two panels. However, it is also well known that any lateral movement creates pressures which act against the faces of the panels and must be resisted by the restraining fixture, making production more difficult and costly.

It is also known that lateral movement of the foam adversely affects the structural strength of the panels produced. This stems from the fact that during the foaming process, the material expands, reacts and forms an increasing viscous polymeric mass; and as the polymerization proceeds, accompanied by expansion, the cells of the foam become elongated from the original spherical shape, taking the shape of an irregular polyhedra, the long axis of which is oriented in the direction of foam travel. In many cases, at least for substantial travel, the cross-sectional area of the polyhedra in the direction of travel may be 3 times greater than in the transverse direction of normal cell growth. The ratio of areas is approximately proportional to the travel of the foam, although it is also effected to some extent by the method of foam application as, for example, whether pour-in-place or froth application techniques are used. Chemical characteristics of the foam are also important.

The elongation of the foam cells, particularly in the direction parallel to the panel surfaces, is an undesirable characteristic as it reduces the effective compressive strength, and the core shear modulus of the foam core, in approximate proportion to the ratio of the cross-sectional area of the cellular polyhedra. Thus, the greater the lateral travel of the foam, the lower the mechanical strength of the core and the strength of the panel formed. This strength is adversely affected both in compression and in flexure. It will be apparent, therefore, that it is desirable to minimize the lateral travel of the foam to produce a panel of superior strength.

Production methods which produce substantial lateral travel of the foam are also objectionable since they tend to produce a product of widely varying density rather than one of uniformity. This is attributable to the fact that viscous fluids flowing through a conduit will exhibit a pressure drop in proportion to its flow rate and viscosity, as well as other factors. Any such pressure drop will be accompanied by a differential pressure in the cell structure of the foam which will in turn manifest itself as a variation in density of the foam at any given time. It can thus be seen that an increased pressure, resulting from lateral movement of the foam, will produce a density gradient with the highest density at or near the point of injection of the foam, decreasing more or less uniformly to the furthest extent of foam travel. Inasmuch as the strength of the composite panel is only that of its weakest point, the density of the foam used must be such that the lowest density achieved (at the furthest distance from the injection point) is sufficient to maintain the desired core sheer modulus. The increased density near the injection point, it will be noted, serves only to increase cost and weight of the panel; it does not effectively contribute to structural strength.

From the above, it is obvious that economic considerations as well as the strength of the composite panel requires that lateral movement of the foam-in-place core material be minimized. Various attempts have been made to eliminate lateral movement with varying success. Of those methods presently known, there has been some success in reducing the lateral travel either by injecting the foam through multiple holes formed in the side of the fixture or mold, or by inserting a dispensing probe through one end of the mold and then slowly withdrawing the probe at a rate which visually appears to be commensurate with the flow of foam components from the dispensing probe and the volume to be filled. However, neither method has been entirely satisfactory.

In the previous known methods of moving one or more probes, the probes were usually moved by hand in a continuous manner. The probes have also been operated in an intermittent fashion using a probe that was marked along its length by periodically withdrawing the probe to one of the marks, holding the probe in position for a specified period of time and withdrawing it to the next mark. The use of intermittent withdrawals has proven more satisfactory than the continuous hand method since the operator may more easily judge the position of the probe.

The use of electric motors for withdrawing the probe from the panel at a preselected rate has been found to be relatvely impractical since the delivery of the foam may not be consistent over a very long period of time. This is due to slippage in the pumps, variations in viscosity from one batch of foam-forming components to another, and from temperature changes in the storage tanks or pumping system. The combination of varying pressure, changes in viscosity and other factors which affect the amount of foam producing components fed into the probe all contribute to variations between the desired and actual rate of probe withdrawal. For these reasons it has been regarded as impractical to use an electric motor to move the dispensing probe.

In brief, the present invention provides for an automatic regulation of the rate of withdrawal of a foam dispensing probe by first measuring the instantaneous flow rate of the foam forming components, converting these flow rates into electrical values that may be added, then adding the flow rate signals together, varying this value by a factor that is a function of desired density and panel dimension, and utilizing the varied sum as a reference to control the speed of a motor to withdraw the foam dispensing probe.

It will be seen, therefore, that a primary object of this invention is to provide methods and apparatus for reducing the lateral movement of the foam-in-place core material as to produce composite panels of increased strength and greater uniformity than now capable.

Another object of this invention is to provide methods and apparatus of the kind described that may be used economically in a commercial production of composite panels made with a foam-in-place plastics.

Another object is to provide methods and apparatus of the kind described to produce a composite panel of superior strength as compared with similar panels of like thickness.

A further object of the invention is to provide methods and apparatus of the kind described which minimize the lateral movement of the foam-in-place plastic during its formatory stage and yet commensurate with the overall density of the foam to be achieved.

Other objects of this invention will become apparent in view of the following detailed description and the accompanying drawing.

In the drawing forming a part of this application, there is shown one preferred embodiment of this invention in the manufacture of a composite panel comprising skins 1 and 2 rigidly supported by a pair of fixture platens 3 and 4, each held in spaced relation to the other and capable of withstanding the anticipated foaming pressure of the system. A pair of end blocks 5 and 6 are provided at opposite ends of fixture platens 3 and 4 to prevent loss of foam from the transverse ends of the panel. A foam mixing head 7 connected to a foam dispensing probe 8, both of conventional construction, are employed for mixing the foam producing components and dispensing the mixture between skins 1 and 2. The length of probe 8, as shown, is slightly greater than the overall length of the panel to be constructed.

The foam-forming components A and B, such as might be used in production of polyurethane, are stored in reservoirs 9 and 10. These reservoirs may be temperature controlled by suitable means (not shown) to insure uniformity during production. Component A is fed to mixing head 7 by a pump 11 through a conduit 12. At least part of the flow passes through a flow meter 13 which measures the rate of flow of component A into mixing head 7. In similar fashion, reservoir 10 for component B fluidly communicates with mixing head 7 through a pump 14 and a conduit 15, a flow meter 16 being provided to measure the flow of component B into the mixing head. It is to be understood that at least one portion of conduits 12 and 15 should be flexible to allow movement of mixing head 7 and probe 8 without requiring a corresponding movement of reservoirs 9 and 10, pumps 11 and 14 and flow meters 13 and 16.

If froth operation is desired, a volatile blowing agent may be introduced from a reservoir 17. This blowing agent, which has a vapor pressure greater than atmosphere at the temperature under which it is stored, is held under pressure by a compressed inert gas, such as nitrogen, in a tank 18. A pressure regulator 19 controls the pressure applied to reservoir 17. The voltatile blowing agent in reservoir 17 is conducted to mixing head 7 through a flow meter 20, a regulator 21 which may be automatically or manually adjusted, and a flexible conduit 22.

Referring to each of the flow meter devices 13, 16 and 20, it will be noted that each is equipped with an electrical transducer which provides an output voltage in proportion to the flow rate of the foam system component or blowing agent passing therethrough. In the case of the foam-forming components, the flow rate of each material is most conveniently measured by a positive displacement type flow meter to which a direct current tachometer may be connected, such devices being indicated by reference numbers 23 and 24. In the case of the blowing agent, a variable area type flow meter has been found most suitable, such as one having a float that is positioned in linear relationship to the flow rate. An electrical transducer 25, operated by the movement of the float, functions to provide an electrical output proportional to the rate of flow through flowmeter 20.

The output voltage of tachometers 23 and 24 and transducer 25 are led to individual calibrating potentiometers 26, 27 and 28, respectively. The resistance and slider position of each potentiometer is such that the individual outputs of the transducers are weighted for their individual calibration factors, including specific gravity, thus providing voltage outputs which are directly proportional to the mass flow rates of the components and blowing agent. These output voltages are led to a summing point 29 through input resistors 30, 31 and 32, each of equal value. The value of the "summed" output voltages is then fed to an operational amplifier 33 which procides an output with a gain regulated by feedback resistor 34 and input resistors 30, 31 and 32. The output voltage of amplifier 33 is connected to one input of a voltage comparator 35, a second input thereto being connected to the output of a tachometer 36 connected to a drum 37 and driven by a motor 38. One end of a cable 39 connects to the mixing head 7, the other end of the cable being wrapped around drum 37 so that its rotation results in a withdrawal of the probe.

As the output voltage of tachometer 36 is in direct proportion to the rate of probe withdrawal, and since the output voltage of operational amplifier 33 is directly proportional to the desired rate of probe withdrawal based on mass rate of flow, a difference between voltage inputs to comparator 35 will result in a voltage output of appropriate value as may be needed to increase or decrease the movement of the probe. It is contemplated, however, that the output of comparator 35 may be directly connected to a silicon controlled rectifier and voltage source 40 having an output connected to motor 38.

The illustrated control circuit also contemplates the use of a potentiometer 41 to vary the output of voltage comparator 35 is accordance with desired density and panel dimensions. A change in setting of the potentiometer may then be utilized to increase or decrease the speed of the motor to compensate for fixed variables of the particular system in use.

Although a preferred embodiment of this invention has been illustrated and described, various modifications and changes may be resorted to without departing from the spirit of the invention or the scope of the attached claims, and each of such modifications and changes is contemplated.

What I claim is:

1. In apparatus for filling molds and forming panels with foam-in-place plastics using a movable probe, apparatus comprising: means for moving said probe at a controlled rate; a mixing head connected to said probe for combining various components used to produce a plastic foam; a reservoir for each of the essential components, respectively; means for feeding each of the essential components into said mixing head; means for measuring the speeds at which said components are fed to said mixing head; means for producing a signal in proportion to the mass flow rate of the components; and means responsive to said signal for operating said means for moving said probe at a controlled rate.

2. The apparatus of claim 1, said means for measuring the speeds at which said components are fed to said mixing head comprising a plurality of flow meters, one flow meter being in fluid communication with one of a plurality of conduits for feeding the essential components into said mixing head; means operated by said flow meters for producing electrical output signals proportional to the volumetric flow through the flow meters associated therewith; a calibrating and adding circuit connected to said means for producing electrical output signals, said circuit producing a second output signal in proportion to the mass flow rate of the components.

3. The apparatus of claim 2, said means for moving said probe at a controlled rate comprising a variable speed motor having an armature connected to a variable voltage source, said voltage source being controlled by and varied as a function of the second output signal.

4. The apparatus of claim 3, said voltage source being connected to the output of a voltage comparator having a first input connected to said second output signal and a second input connected to the output of a tachometer driven by said motor.

5. The apparatus of claim 4, and further including means for selectively adjusting the voltage output of said voltage comparator to compensate for desired density and panel dimension.

6. The apparatus of claim 1, and further comprising a source of liquid foaming agent, means connecting said foaming agent to said mixing head including a flow meter and a flow regulator, means for electrically sensing the flow rate of said foaming agent and producing an electrical signal in proportion to the mass flow rate through said flow meter, and circuit means for adding the mass flow rates of said essential components and foaming agent to produce a second output signal proportionate to the sum of the mass flow rates.

References Cited

UNITED STATES PATENTS

| | | | |
|---|---|---|---|
| 3,164,860 | 1/1965 | Oxel | 18—5 |
| 3,444,279 | 5/1969 | Dost | 264—51X |

H. A. KILBY, JR., Primary Examiner

U.S. Cl. X.R.

264—51